July 28, 1953 O. IMBER 2,647,043
CRYSTAL GROWING APPARATUS
Filed Sept. 23, 1948
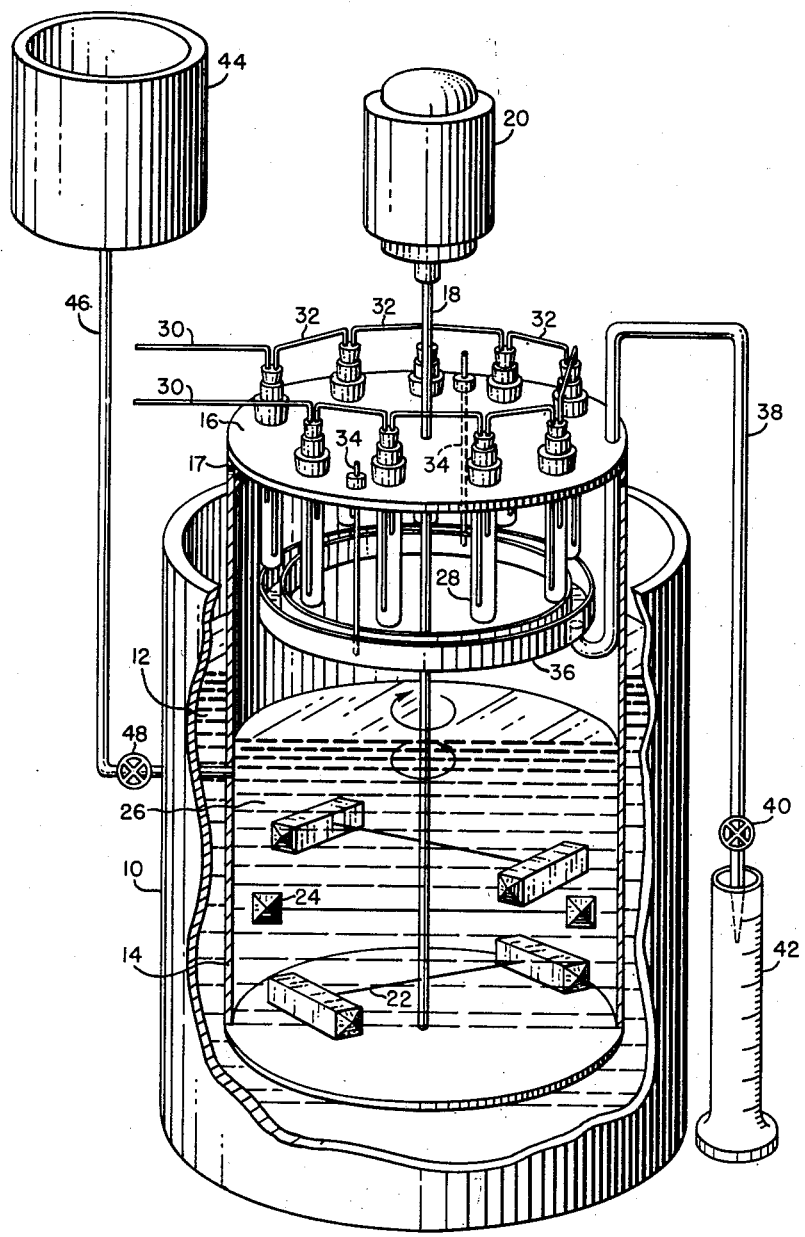
INVENTOR.
OSCAR IMBER
BY Patented July 28, 1953

2,647,043

UNITED STATES PATENT OFFICE 2,647,043

CRYSTAL GROWING APPARATUS

Oscar Imber, Silver Spring, Md.

Application September 23, 1948, Serial No. 50,725

1 Claim. (Cl. 23—273)

(Granted under Title 35, U. S. Code (1952), sec. 266)

This invention relates to crystal growing apparatus and to a method of growing crystals. In particular the invention relates to a method of controlling the rate of crystallization by means of controlling the rate of evaporation at a fixed temperature of the crystallizing solution. This control is accomplished by means of a particular type of condenser positioned within the crystallizing chamber.

The general object of the invention is to provide means for controlling the rate of evaporation of a crystallizing solution thereby controlling the rate of crystal growth from said solution.

It is a further object to provide means for controlling the rate of crystal growth from a crystallizing solution by evaporation thereof in a closed system of crystallization.

It is an additional object of the invention to provide means for hindering the spontaneous formation of nuclei of crystallization in the crystallizing solution and to prevent the "creepage" of the solute up the sidewalls of the crystallizing tank.

Other objectives, such as efficiency in operation, will be apparent from the following description and from the drawing hereto attached which is merely illustrative of a preferred form of the invention and is not limitative to the particular form disclosed.

In this drawing:

The single figure is a view, partly in elevation, partly in section and partly cut away, of a crystallizing tank immersed in a constant temperature bath, partially filled with a crystallizing solution and provided with condenser means for regulating the amount of condensate returned to the solution.

The attainment of the above objectives and a clearer understanding of the applicant's invention will be understood better by further reference to the drawing wherein 10 represents a container which functions as a constant temperature bath being provided with liquid 12 which is maintained at a constant temperature by thermostatically controlled electrical means (not shown). Crystallizing chamber 14 is immersed in this bath and is provided with lid 16 which makes a tight seal therewith as at 17. Projecting vertically and axially through lid 16 there may be a shaft 18 which is rotatably driven alternately for periods of time in a clockwise and counterclockwise direction at a predetermined speed by electrical motor and reversing gear means 20. Near the lower end of shaft 18 is a plurality of radial arms 22 angularly positioned with respect to each other. These radial arms are adapted to support seed crystals 24 which are submerged in crystallizing solution 26. Projecting through lid 16 in an annular array are tubes 28. These tubes are supported by lid 16 and are in sealed relationship therewith. U tubes 30 and 32 connect tubes 28 in series and are adapted to conduct cooling water therethrough. Suspended by rods 34 from lid 16 is annular trough or sump 36. This trough is centered on tubes 28 and is adapted to catch the condensate dripping from cooling tubes 28. Siphon 38 is connected to the bottom of trough 36 and is adapted to withdraw the condensate from trough 36 at a rate controlled by valve 40. Siphon 38 discharges the condensate into graduated tube 42 which measures the volume of condensate withdrawn.

The drawing discloses seed crystals mounted on the radial arms of a motor driven shaft. This is merely for purposes of illustration of apparatus for growing a particular type of crystal. There are salt crystals which can not be grown from seeds mounted on radial arms as here shown. Such crystals crack and break in two at the radial arm support. Crystals of this type are grown by suspending the seed on a fine wire in the solution or may be grown by supporting the seeds in a rack on the bottom of the crystallizing tank. In either case means are provided for circulating the solution to thoroughly scrub the crystal growing faces of the seed. The applicant's condenser is applicable for the control of the rate of growth of the latter types of crystals by controlling the rate of evaporation of the solution.

There are several processes which may be used to grow crystals. The particular process used is determined by the type of solution and the physical characteristics of the salt to be crystallized. Among these processes are:

1. Crystallization of a salt having a normal solubility curve from a solution thereof which is saturated at a relatively elevated temperature. This solution is cooled to a lower temperature and the salt in excess of that forming a saturated solution at the lower temperature crystallizes out. This process is generally carried out in a sealed system and is not attended with any evaporation. Examples of salts which may be crystallized by this process are, ammonium dihydrogen phosphate and alum.

2. Crystallization of a salt from a melt thereof upon cooling. Examples are, silver chloride and sodium chloride.

3. Crystallization from flame fusion. In this process the material to be crystallized in powdered form is fed into an oxy-hydrogen flame where it is quickly fused. As the material passes from the flame it crystallizes. Examples of a material which may be crystallized in this manner are aluminum oxide, calcium tungstate, titanium dioxide, etc.

4. Crystallization from a solution by free and uncontrolled evaporation thereof. This is the usual method for obtaining sea salt.

5. Crystallization from a supersaturated solution by means of recirculating the crystallizing solution from the crystallizing tank through a saturating tank whereby the salt crystallized out is replaced and supersaturated solution is returned to the crystallizing tank at a rate to maintain the proper growth of the crystal.

6. Crystallization by controlled evaporation of a saturated solution in a closed system by condensing the vapor formed by evaporation of the solvent at a fixed temperature and removal of a predetermined part thereof. This process is applicable to continuous or batch operation. This is the applicant's method. Examples of salts which may be crystallized by this method are those having inverse solubility characteristics, e. g., lithium sulphate, cerium sulphate and ytterbium sulphate.

Salts of an inverse solubility characteristic can not be crystallized by the process described in (1) above, since as the temperature of the solution is lowered the salt becomes more soluble therein. But such salts may be crystallized from solution by a reversal of this process. A solution of the salt may be prepared at a relatively low temperature. The solution may then be heated to a higher temperature and the excess of the salt over that amount soluble in the solvent at the higher temperature crystallizes out. Of course, all of the material as in process (1) does not crystallize out. If the solution is evaporated at the higher temperature all of the material in solution will crystallize. By controlling the rate of this evaporation the rate of crystal growth may be controlled. This is the applicant's process.

The operation of the applicant's process for the crystallization of salts having inverse solubility characteristics consists essentially in placing a solution of the salt, saturated at a relatively low temperature in crystallizing tank 14 which is positioned in constant temperature bath 10 in which fluid 12 is at a relatively much higher temperature. The lid assembly supporting the seed crystal bearing shaft, motor drive and condenser elements is then placed on the crystallizing tank. Sufficient solution has been added to provide a vapor space immediately thereabove. The vapor resulting from the evaporation of the solvent collects in this vapor space. As it comes into contact with the cold tubes of the condenser it condenses and drains from these tubes into trough 36. This trough fills up and the overflow may be allowed to drip back into the solution. Under this condition the closed system comes to an equilibrium at which the rates of evaporation of the solution and of condensation counterbalance each other. The volume of the solution remains constant but the concentration of the dissolved salt becomes less by the amount of salt crystallized out. By this method of operation all of the dissolved salt does not crystallize. The part soluble in the solution at the temperature of operation remains in solution. The control of the rate of crystallization is not close.

But if it is desired to operate at a relatively high rate of crystallization this may be accomplished by withdrawing any proportion of the condensate from trough 36 by means of siphon 38 through valve 40 and into graduated flask 42. If a volume of condensate is withdrawn approximately equal to that of the solution containing the amount of the salt crystallized out, the volume of the solution becomes less but the concentration remains constant. Since the rate of evaporation at the particular temperature may exceed the rate of production of salt free solvent by the crystallization, by withdrawing all of the condensate the concentration of the solution is increased and likewise the rate of crystallization. Such a rate may be high enough to produce flaws in the formed crystals by heterogeneous placement of the nuclei of crystallization on the crystal faces. The rate of withdrawal of the condensate is therefore regulated to that of good crystal formation.

After this optimum rate of withdrawal has been established the addition of an approximately equal volume of solution saturated at the original temperature from reservoir 44, tubing 46 and valve 48 will maintain the volume and concentration of the solution substantially constant and the process becomes continuous. The growth of relatively large crystals free from flaws is thereby obtained.

One of the distinct advantages of the applicant's apparatus and method is that the return of a part of the condensate to the crystallizing solution forms a layer of relatively pure solvent on top of the said solution. This pure solvent prevents the spontaneous formation of nuclei of crystallization by dissolving them as fast as they form and furthermore, the presence of the pure solvent on top of the solution inhibits the creepage of salt from the solution up the sides of the crystallizing tank.

The applicant's process may also be applied to the crystallization of salts having normal solubility characteristics. The only difference in operation is that the bath acts as a coolant of the crystallizing solution instead of as heating agent. In fact, the applicant's apparatus and methods are advantageously employed in growing a crystal of any salt having a relatively flat solubility curve whether reverse or normal.

The applicant's invention is therefore seen to consist essentially of a particular type of a condenser which may be used as an apparatus element in crystallization apparatus and in the method of operating such condenser. While the method of operation is closely related to the type of condenser it is not necessarily limited to the particular type disclosed.

Therefore, while a particular type of condenser has been disclosed as a preferred embodiment of the invention it is not desired to be strictly limited thereto as obviously other types of heat exchanging elements could be used without vitiating the results. Such variations in structure are intended to be included within the scope of the invention to the extent as defined by the herewith appended claim.

The invention described herein may be manufactured and used by or for the Government of the United States of America for governmental purposes without the payment of any royalties thereon or therefor.

What is claimed is:

In a crystal growing apparatus, a closed crystallizing evaporation chamber for holding a solution of the salt to be crystallized, said chamber having upright side walls defining the periphery of the evaporating surface of a solution partially filling the chamber, a plurality of cooled surface condenser elements disposed within the chamber in a vapor space above said solution surface in a circular horizontally spaced array paralleling the periphery of the surface of the solution as defined by the walls of the chamber, a shallow open top parallel-sided trough positioned within the chamber below the condenser elements shaped to extend along beneath the condenser elements paralleling the periphery of the surface of the solution as defined by the walls of the chamber, said trough being relatively shallow and of low capacity to permit continuous overflow onto the surface of the solution near the said periphery as defined by the side walls of the chamber whereby pure solvent condensed within the chamber is continuously returned to the solution at points near the periphery of the evaporating surface to inhibit the production and creepage of salt crystals up the sides of the chamber, and valve controlled conduit means connected with the interior of the trough for drawing condensate out of the system.

OSCAR IMBER.

References Cited in the file of this patent

UNITED STATES PATENTS

| Number | Name | Date |
| --- | --- | --- |
| 984,645 | Bock | Feb. 21, 1911 |
| 2,045,302 | Langer | June 23, 1936 |
| 2,484,829 | Holden | Oct. 18, 1949 |

FOREIGN PATENTS

| Number | Country | Date |
| --- | --- | --- |
| 927,763 | France | Nov. 10, 1947 |

OTHER REFERENCES

Catalogue: Fisher Scientific Co., Pittsburgh, Pa., No. 90, 1942, page 439.